United States Patent
Maruyama et al.

(10) Patent No.: US 10,920,010 B2
(45) Date of Patent: Feb. 16, 2021

(54) EPOXY RESIN, EPOXY RESIN COMPOSITION, EPOXY RESIN CURED PRODUCT, AND COMPOSITE MATERIAL

(71) Applicant: Showa Denko Materials Co., Ltd., Tokyo (JP)

(72) Inventors: Naoki Maruyama, Tokyo (JP); Tomoko Higashiuchi, Tokyo (JP); Kazumasa Fukuda, Tokyo (JP); Yuka Yoshida, Tokyo (JP); Yoshitaka Takezawa, Tokyo (JP)

(73) Assignee: Showa Denko Materials Co., Ltd., Tokyo (JP)

( * ) Notice: Subject to any disclaimer, the term of this patent is extended or adjusted under 35 U.S.C. 154(b) by 0 days.

(21) Appl. No.: 16/341,587

(22) PCT Filed: Oct. 13, 2017

(86) PCT No.: PCT/JP2017/037268
§ 371 (c)(1),
(2) Date: Apr. 12, 2019

(87) PCT Pub. No.: WO2018/070535
PCT Pub. Date: Apr. 19, 2018

(65) Prior Publication Data
US 2019/0338068 A1 Nov. 7, 2019

(30) Foreign Application Priority Data

Oct. 14, 2016 (WO) ............... PCT/JP2016/080631

(51) Int. Cl.
*C08G 59/24* (2006.01)
*C08L 63/00* (2006.01)
*C08J 5/24* (2006.01)
*B32B 27/38* (2006.01)
*C08G 59/22* (2006.01)
*C08G 59/50* (2006.01)

(52) U.S. Cl.
CPC ......... *C08G 59/226* (2013.01); *C08G 59/245* (2013.01); *C08G 59/504* (2013.01)

(58) Field of Classification Search
CPC ....... C08L 63/00; C08G 59/226; C08G 59/24; C08G 59/245; C08J 5/24; B32B 27/38
USPC .......................................... 523/427
See application file for complete search history.

(56) References Cited

U.S. PATENT DOCUMENTS

| 2,951,778 | A * | 9/1960 | Haberlin ............. C08G 59/182 |
| | | | 428/416 |
| 4,594,291 | A * | 6/1986 | Bertram ................. C08G 59/02 |
| | | | 428/414 |
| 9,242,948 | B2 * | 1/2016 | Asaumi ................... C07C 67/08 |
| 2010/0080997 | A1 | 4/2010 | Seki et al. |
| 2012/0149807 | A1 * | 6/2012 | Asaumi ................... C07C 67/08 |
| | | | 523/457 |
| 2017/0349695 | A1 * | 12/2017 | Katagi ....................... C08J 5/18 |
| 2019/0040183 | A1 * | 2/2019 | Yoshida ............... C08G 59/245 |
| 2020/0002464 | A1 * | 1/2020 | Yoshida ..................... C08J 5/10 |

FOREIGN PATENT DOCUMENTS

| JP | 2016-113540 A | 6/2016 |
| WO | WO-2016/104772 A1 | 6/2016 |
| WO | WO-2016/104788 A1 | 6/2016 |

* cited by examiner

*Primary Examiner* — Michael J Feely
(74) *Attorney, Agent, or Firm* — Faegre Drinker Biddle & Reath LLP

(57) ABSTRACT

An epoxy resin, comprising a first epoxy compound having a mesogenic structure and a second epoxy compound having two or more mesogenic structures that are the same as the mesogenic structure of the first epoxy compound,
a proportion, determined by liquid chromatography, of the first epoxy compound being from 40% to 50% with respect to a total amount of the epoxy resin.

9 Claims, No Drawings

EPOXY RESIN, EPOXY RESIN COMPOSITION, EPOXY RESIN CURED PRODUCT, AND COMPOSITE MATERIAL

TECHNICAL FIELD

The invention relates to an epoxy resin, an epoxy resin composition, an epoxy resin cured product, and a composite material.

BACKGROUND ART

Epoxy resin is used in various applications for its excellent thermal resistance. In view of a trend of increasing the use temperature of a power device, improvement in thermal conductivity of epoxy resin has been studied.

An epoxy resin including an epoxy compound having a mesogenic structure in its molecule (hereinafter, also referred to as a mesogen-containing epoxy resin) is known to exhibit excellent thermal conductivity. However, since a mesogen-containing epoxy resin generally has a higher viscosity than other epoxy resins, fluidity may not be sufficient during the processing.

In this regard, addition of a solvent to reduce viscosity may be a possible way to improve the fluidity of a mesogen-containing epoxy resin. Further, as a mesogen-containing epoxy resin having excellent fluidity and thermal conductivity, an epoxy resin having a specific molecular size, obtained by reacting an epoxy monomer having a mesogenic structure with a divalent phenol compound, has been proposed (see, for example, Patent Document 1 and Patent Document 2).

PRIOR ART DOCUMENTS

Patent Document

[Patent Document 1] International Publication No. WO 2016-104772
[Patent Document 2] Japanese Patent Application Laid-Open No. 2016-113540

SUMMARY OF THE INVENTION

Problems to be Solved by the Invention

In a method of adding a solvent to a mesogen-containing epoxy resin, formation of voids due to the solvent may occur during curing, and affect the product quality. The mesogen-containing epoxy resins obtained by the method described in Patent Document 1 and Patent Document 2 have a lowered softening point, but are still high in viscosity and yet to be improved in terms of handleablitiy.

In view of the above, the invention aims to provide an epoxy resin and an epoxy resin composition having excellent handleability. The invention also aims to provide an epoxy resin cured product and a composite material obtained by using the epoxy resin or the epoxy resin composition.

Means for Solving the Problem

The means for solving the problem include the following embodiments.

<1> An epoxy resin, comprising a first epoxy compound having a mesogenic structure and a second epoxy compound having two or more mesogenic structures that are the same as the mesogenic structure of the first epoxy compound, a proportion, determined by liquid chromatography, of the first epoxy compound being from 40% to 50% with respect to a total amount of the epoxy resin.

<2> The epoxy resin according to <1>, wherein the first epoxy compound comprises an epoxy compound represented by the following Formula (M):

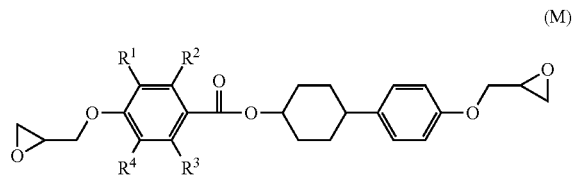

wherein, in Formula (M), each of $R^1$ to $R^4$ independently represents a hydrogen atom or an alkyl group having from 1 to 3 carbon atoms.

<3> The epoxy resin according to <1> or <2>, wherein the second epoxy compound comprises an epoxy compound having two or more structures represented by the following Formula (I):

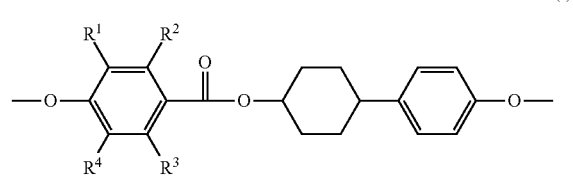

wherein, in Formula (I), each of $R^1$ to $R^4$ independently represents a hydrogen atom or an alkyl group having from 1 to 3 carbon atoms.

<4> The epoxy resin according to <3>, wherein the second epoxy compound comprises an epoxy compound having two of the structures represented by Formula (I).

<5> The epoxy resin according to any one of <1> to <4>, wherein the second epoxy compound comprises at least one selected from the group consisting of structures represented by the following Formulae (II-A) to (II-D):

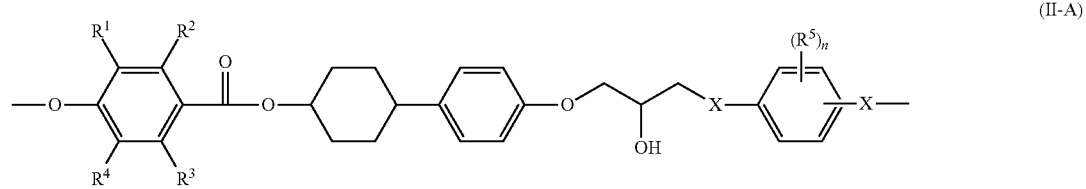

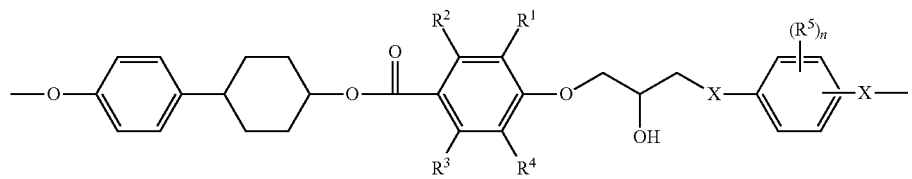

(II-B)

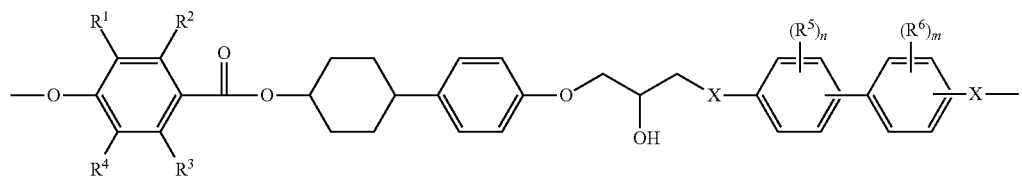

(II-C)

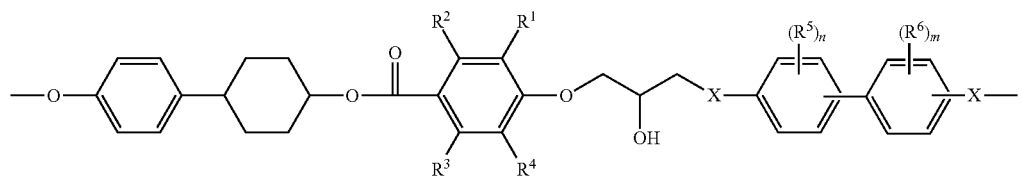

(II-D)

wherein, in Formulae (II-A) to (II-D), each of $R^1$ to $R^4$ independently represents a hydrogen atom or an alkyl group having from 1 to 3 carbon atoms, each of $R^5$ and $R^6$ independently represents an alkyl group having from 1 to 8 carbon atoms, each of n and m independently represents an integer from 0 to 4, and each X independently represents —O— or —NH—.

<6> An epoxy resin composition, comprising the epoxy resin according to any one of <1> to <5> and a curing agent.

<7> The epoxy resin composition according to <6>, configured to form a smectic structure in a cured state.

<8> An epoxy resin cured product, comprising a cured product of the epoxy resin composition according to <6> or <7>.

<9> A composite material, comprising the epoxy resin cured product according to <8> and a reinforcing material.

Effect of the Invention

According to the invention, an epoxy resin and an epoxy resin composition having excellent handleability are provided. Further, an epoxy resin cured product and a composite material obtained by using the epoxy resin or the epoxy resin composition are provided.

EMBODIMENTS FOR IMPLEMENTING THE INVENTION

In the following, the embodiments for implementing the invention are explained. However, the invention is not limited to the embodiments. The elements of the embodiments (including steps) are not essential, unless otherwise stated. The numbers and the ranges thereof do not limit the invention as well.

In the specification, the numerical range represented by "from A to B" includes A and B as a minimum value and a maximum value, respectively.

In the specification, when numerical ranges are described in a stepwise manner, the values of the upper or lower limit of each numerical range may be substituted by the values of the upper or lower limit of the other numerical range, or may be substituted by the values described in the Examples.

In the specification, when there are more than one kind of substances corresponding to a component of a composition, the content of the component refers to a total content of the substances, unless otherwise stated.

In the specification, the epoxy compound refers to a compound having an epoxy group in its molecule. The epoxy resin refers to a collective concept of epoxy compounds that are not in a cured state.

<Epoxy Resin>

The epoxy resin of the embodiment includes a first epoxy compound having a mesogenic structure and a second epoxy compound having two or more mesogenic structures that are the same as the mesogenic structure of the first epoxy compound, and having a proportion, determined by liquid chromatography, of the first epoxy compound of from 40% to 50% with respect to a total amount of the epoxy resin.

The inventors have found that an epoxy resin, in which a proportion, determined by liquid chromatography, of the first epoxy compound is from 40% to 50% with respect to a total amount of the epoxy resin, tends to be easier to decrease in viscosity during a process of increasing the temperature, and exhibits superior handleability, as compared with an epoxy resin in which the proportion of the first epoxy compound is greater than 50% with respect to a total amount of the epoxy resin. The reason for this is not clear, but it is presumed that crystal precipitation in the epoxy resin at a temperature under a melting point is suppressed in an epoxy resin with a proportion of the first epoxy compound being 50% or less, as compared with an epoxy resin having a proportion of the first epoxy compound of greater than 50%. In addition, the inventors have found that an epoxy resin with a proportion of the first epoxy compound of less than 40% is high in viscosity due to an increase in molecular size, and tends to exhibit inferior handleability.

In the embodiment, the proportion of the first epoxy compound determined by liquid chromatography refers to a proportion of an area of a peak derived from the first epoxy compound with respect to a total area of peaks derived from all epoxy compounds, shown in a chart obtained by liquid chromatography. More specifically, the proportion of the first epoxy compound is determined by detecting an absorbance at a wavelength of 280 nm of an epoxy resin for the measurement, and calculating the detected results by the following formula.

Proportion of area of peak derived from first epoxy compound (%)=(area of peak derived from first epoxy compound/total area of peaks derived from all epoxy compounds)×100

The liquid chromatography is performed by using tetrahydrofuran as a mobile phase, at a sample concentration of 0.5% by mass and a flow rate of 1.0 ml/min. The measurement can be performed by using, for example, L6000 from Hitachi, Ltd as a high-speed liquid chromatograph and C-R4A from Shimadzu Corporation as a data analyzer, with GPC columns such as G2000HXL and G3000HXL from Tosoh Corporation.

From the viewpoint of improving handleability, the proportion of the first epoxy compound, determined by liquid chromatography, is preferably 50% or less, more preferably 49% or less, further preferably 48% or less, with respect to the total amount of the epoxy resin.

From the viewpoint of intrinsic viscosity (melt viscosity), the proportion of the first epoxy compound, determined by liquid chromatography, is not particularly limited as long as it is 40% or more, it is preferably 41% or more, more preferably 42% or more, with respect to the total amount of the epoxy resin.

The epoxy resin may include an epoxy compound other than the first epoxy compound and the second epoxy compound. In that case, the proportion of the epoxy compound other than the first epoxy compound and the second epoxy compound is preferably 10% or less of the total amount of the epoxy resin.

The epoxy resin of the embodiment include an epoxy compound having a mesogenic structure. Therefore, a higher-order structure is formed in a cured product that is obtained by reaction with a curing agent. Therefore, the cured product obtained by using the epoxy resin of the embodiment exhibits excellent thermal conductivity.

The higher-order structure refers to a structure in which structural elements are arranged to form a micro-and-organized structure. Examples of the higher-order structure include a crystalline phase and a liquid crystalline phase, and existence thereof can be determined with a polarizing microscope. Specifically, existence of a higher-order structure can be determined by whether or not an interference pattern due to depolarization is observed under crossed Nicols. A higher-order structure generally exists in a cured product of an epoxy resin composition and forms a domain structure in the form of islands, wherein each island corresponds to a higher-order structure. The structural elements of the higher-order structure are generally formed by covalent bonding.

Examples of a higher-order structure formed in a cured product include a nematic structure and a smectic structure, which are a liquid crystal structure, respectively. The nematic structure is a liquid crystal structure that has only an orientational order in which molecules are arranged in one direction. The smectic structure is a liquid crystal structure that has a one-dimensional order in addition to an orientational order, and forms a lamellar structure. The degree of order is higher in a smectic structure than in a nematic structure. Therefore, a smectic structure is preferred in terms of thermal conductivity of a cured product.

Whether or not a smectic structure is formed in a cured product obtained by using the epoxy resin of the embodiment can be determined by X-ray diffraction measurement by using, for example, an X-ray diffractometer from Rigaku Corporation. When measurement is performed using CuKα1 line under a tube voltage of 40 kV, a tube current of 20 mA, a sampling width of 0.01, and a measurement range of 2θ=2° to 30°, a cured product having a smectic structure exhibits a diffraction peak within a range of 2θ=2° to 10°.

(First Epoxy Compound)

The first epoxy compound is not particularly limited, as long as it has a mesogenic structure.

The mesogenic structure refers to a partial structure that contributes to expression of liquid crystallinity, and examples thereof include a biphenyl structure, a phenyl benzoate structure, a cyclohexyl benzoate structure, an azobenzene structure, a stilbene structure, a terphenyl structure, a naphthalene structure, an anthracene structure, derivatives of these structures, and a structure in which two or more of these structures are linked via a linking group.

Since a compound having a mesogenic structure may exhibit liquid crystallinity in a reaction-inducing manner, it is important whether the compound exhibits liquid crystallinity in a cured product thereof.

The epoxy resin may include a single kind of first epoxy compound alone, or may include two or more kinds having different molecular structures.

The molecular weight of the first epoxy compound is not particularly limited. In a case of synthesizing the second epoxy compound from the first epoxy compound using a solvent, the molecular weight of the first epoxy compound is preferably 800 or less, more preferably 600 or less. From the viewpoint of forming a higher-order structure of a cured product, the molecular weight of the first epoxy compound is preferably 30 or more, more preferably 350 or more/

A preferred example of the first epoxy compound is a compound represented by the following Formula (M). The compound represented by Formula (M) forms a smectic structure in a cured product obtained by reaction with a curing agent. When the first epoxy compound is a compound represented by Formula (M), the first epoxy compound may be a single kind of the compound represented by Formula (M) or may be a combination of two or more kinds of the compound represented by Formula (M).

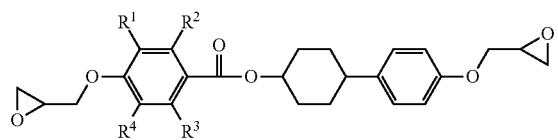

(M)

In Formula (M), each of $R^1$ to $R^4$ independently represents a hydrogen atom or an alkyl group having from 1 to 3 carbon atoms. Each of $R^1$ to $R^4$ is preferably a hydrogen atom or an alkyl group having 1 or 2 carbon atoms, more preferably a hydrogen atom or a methyl group, further preferably a hydrogen atom. The number of hydrogen atom represented by $R^1$ to $R^4$ is preferably from 2 to 4, more preferably 3 or 4, further preferably 4. When any one of $R^1$ to $R^4$ is an alkyl group having from 1 to 3 carbon atoms, the alkyl group is preferably at least one of $R^1$ or R4.

Examples of the compound represented by Formula (M) include compounds described in Japanese Patent Application Laid-Open No. 2011-74366, specifically, at least one selected from the group consisting of 4-{4-(2,3-epoxypropoxy)phenyl}cyclohexyl=4-(2,3-epoxypropoxy)benzoate and 4-{4-(2,3-epoxypropoxy)phenyl}cyclohexyl=4-(2,3-epoxypropoxy)-3-methylbenzoate.

(Second Epoxy Compound)

The second epoxy compound is not particularly limited, as long as it is an epoxy compound having two or more mesogenic structures that are the same as the mesogenic structure of the first epoxy compound.

An epoxy resin including the second epoxy compound, in addition to the first epoxy compound, tends to have a lower viscosity under a temperature that is equal to or lower than the melting point, as compared to an epoxy compound including only the first epoxy compound.

The second epoxy compound may be obtained by reaction of the first epoxy compound and a compound having a functional group that is capable of reacting with an epoxy compound of the first epoxy compound, or may be obtained by self-polymerization of the first epoxy compound, or may be obtained by other methods.

The number of the mesogenic structures, which are the same as the mesogenic structure of the first epoxy compound, in the second epoxy compound is not particularly limited. From the viewpoint of intrinsic viscosity (melt viscosity), the number of the mesogenic structures of the second epoxy compound, which corresponds to the largest proportion obtained by liquid chromatography, is preferably 2.

When the second epoxy compound is obtained by reaction of the first epoxy compound and a compound having a functional group that is capable of reacting with an epoxy group of the first epoxy compound, the second epoxy compound may be a compound having a structure represented by the following Formula (A) or Formula (B).

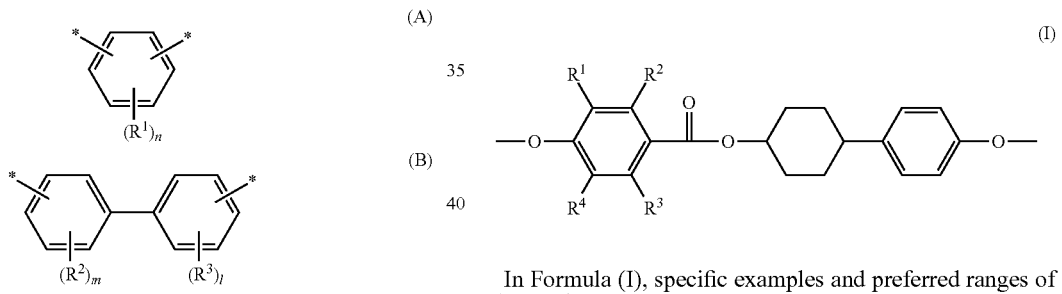

In Formula (A) or Formula (B), * refers to a bonding site to an adjacent atom. Examples of the adjacent atom include an oxygen atom or a nitrogen atom. Each of $R^1$ to $R^3$ independently represents an alkyl group having from 1 to 8 carbon atoms. Each of n, m and l independently represents an integer of from 0 to 4, preferably an integer of from 0 to 2, more preferably an integer of 0 or 1, further preferably 0.

Among the structures represented by Formula (A) or Formula (B), a structure represented by the following Formula (a) or Formula (b) is preferred. An epoxy compound having a structure represented by the following Formula (a) or Formula (b) tends to have a linear molecule structure, and is considered to have a high stacking ability of molecules and more likely to form a higher-order structure.

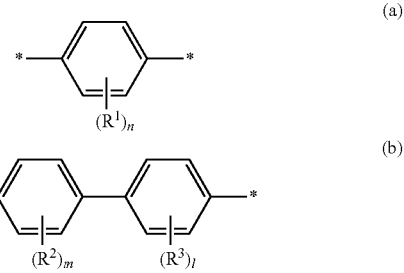

In Formula (a) or Formula (b), the definitions and preferred examples of *, $R^1$ to $R^3$, n, m and l are the same as the definitions and preferred examples of *, $R^1$ to $R^3$, n, m and l.

The second epoxy compound may be an epoxy compound having two or more structures represented by the following Formula (I).

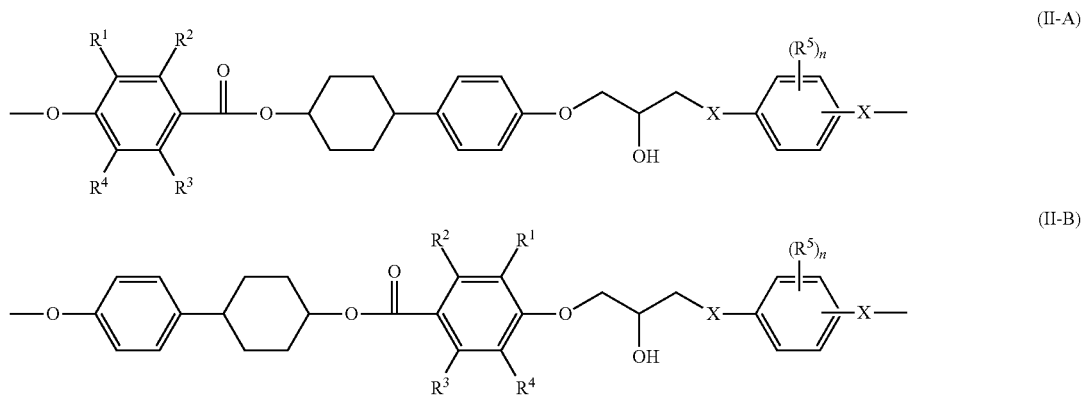

In Formula (I), specific examples and preferred ranges of $R^1$ to $R^4$ are the same as the specific examples and the preferred ranges of $R^1$ to $R^4$ in Formula (M).

The second epoxy compound may be an epoxy compound having a structure represented by at least one selected from the group consisting of the following Formulae (II-A) to (II-D).

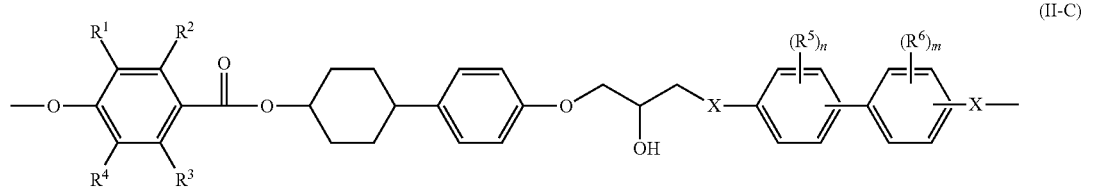
(II-C)

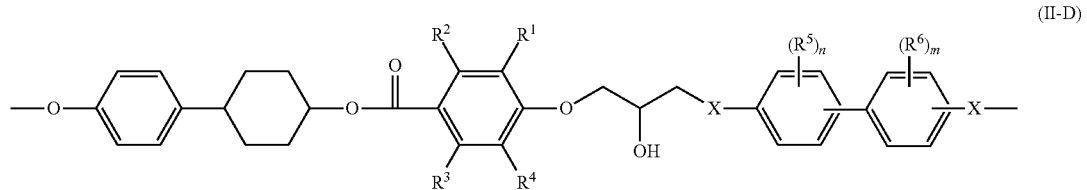
(II-D)

In Formulae (II-A) to (II-D), each of $R^1$ to $R^4$ independently represents a hydrogen atom or an alkyl group having from 1 to 3 carbon atoms, and each of $R^5$ and $R^6$ independently represents an alkyl group having from 1 to 8 carbon atoms. Each of n and m independently represents an integer of from 0 to 4. Each of X independently represents —O— or —NH—.

Specific examples and preferred ranges of $R^1$ to $R^4$ in Formulae (II-A) to (II-D) are the same as the specific examples and the preferred ranges of $R^1$ to $R^4$ in Formula (M).

In Formulae (II-A) to (II-D), each of $R^5$ and $R^6$ preferably independently represents an alkyl group having from 1 to 8 carbon atoms, more preferably an alkyl group having from 1 to 3 carbon atoms, more preferably a methyl group.

In Formulae (II-A) to (II-D), each of n and m independently represents an integer of from 0 to 4, preferably an integer of from 0 to 2, more preferably an integer of 0 or 1, further preferably 0. Specifically, the benzene ring attached with $R^5$ or $R^6$ in Formulae (II-A) to (II-D) preferably has from 2 to 4 hydrogen atoms, more preferably 3 or 4 hydrogen atoms, further preferably 4 hydrogen atoms.

From the viewpoint of forming a higher-order structure, an epoxy compound having a structure represented by at least one selected from the group consisting of the following Formulae (II-a) to (II-d) is preferred.

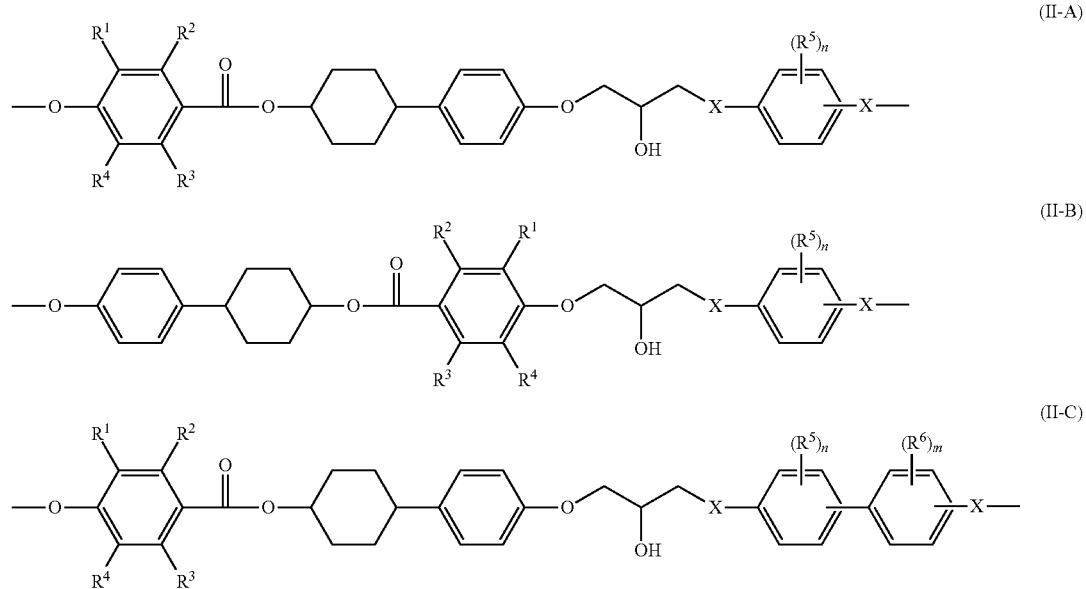

(II-A)

(II-B)

(II-C)

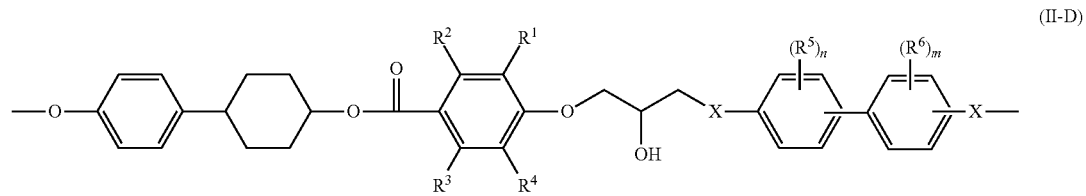
(II-D)

In Formulae (II-a) to (II-d), definitions and preferred examples of $R^1$ to $R^6$, n, m and X are the same as the definitions and the preferred examples of $R^1$ to $R^6$, n, m and X.

Examples of a structure of the second epoxy compound having two structures represented by Formula (I) (dimeric compound) include a compound having a structure represented by at least one of the following Formulae (III-A) to (III-F).

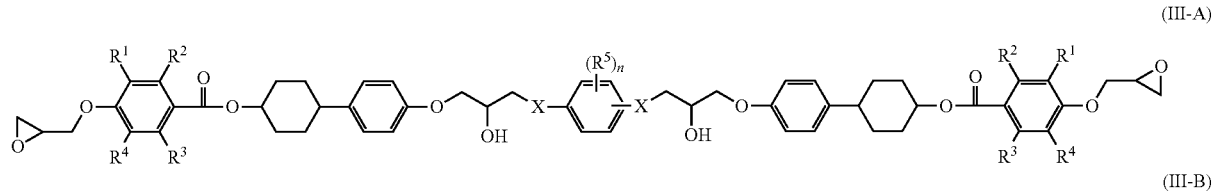
(III-A)

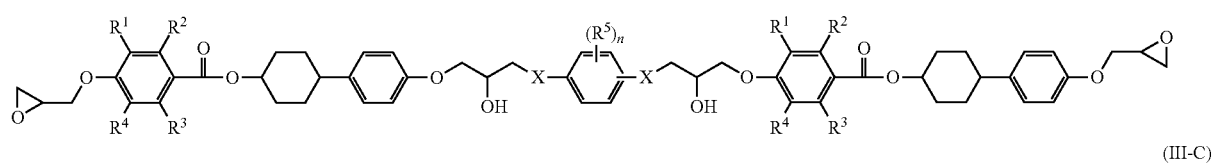
(III-B)

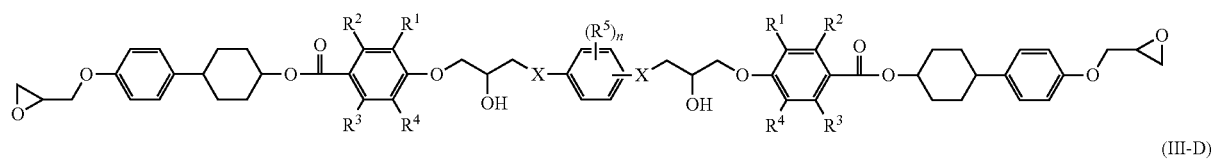
(III-C)

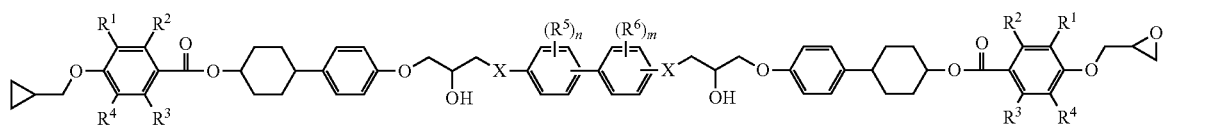
(III-D)

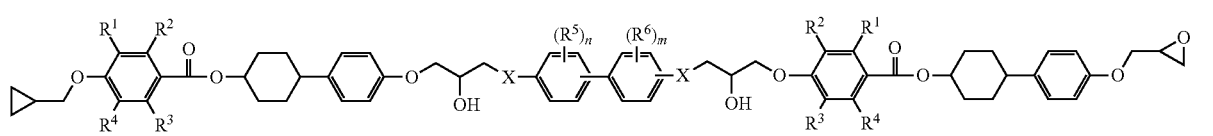
(III-E)

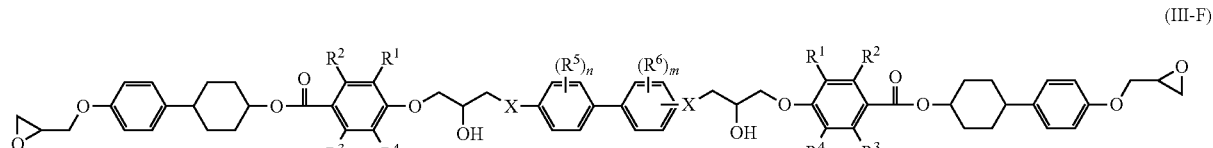
(III-F)

Definitions and preferred ranges of $R^1$ to $R^6$, n, m and X in Formulae (III-A) to (III-F) are the same as the definitions and the preferred ranges of $R^1$ to $R^6$, n, m and X in Formulae (II-A) to (II-D).

From the viewpoint of forming a higher-order structure, epoxy compounds represented by the following Formulae (III-a) to (III-f) are preferred.

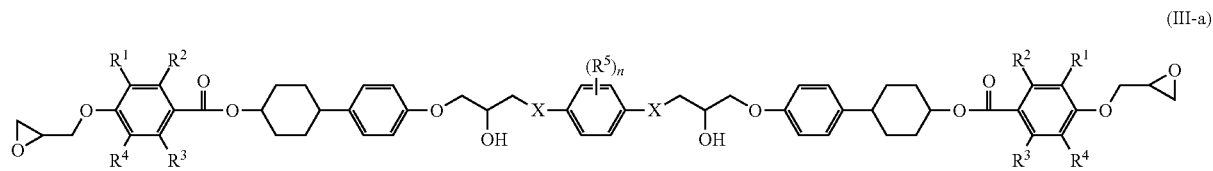
(III-a)

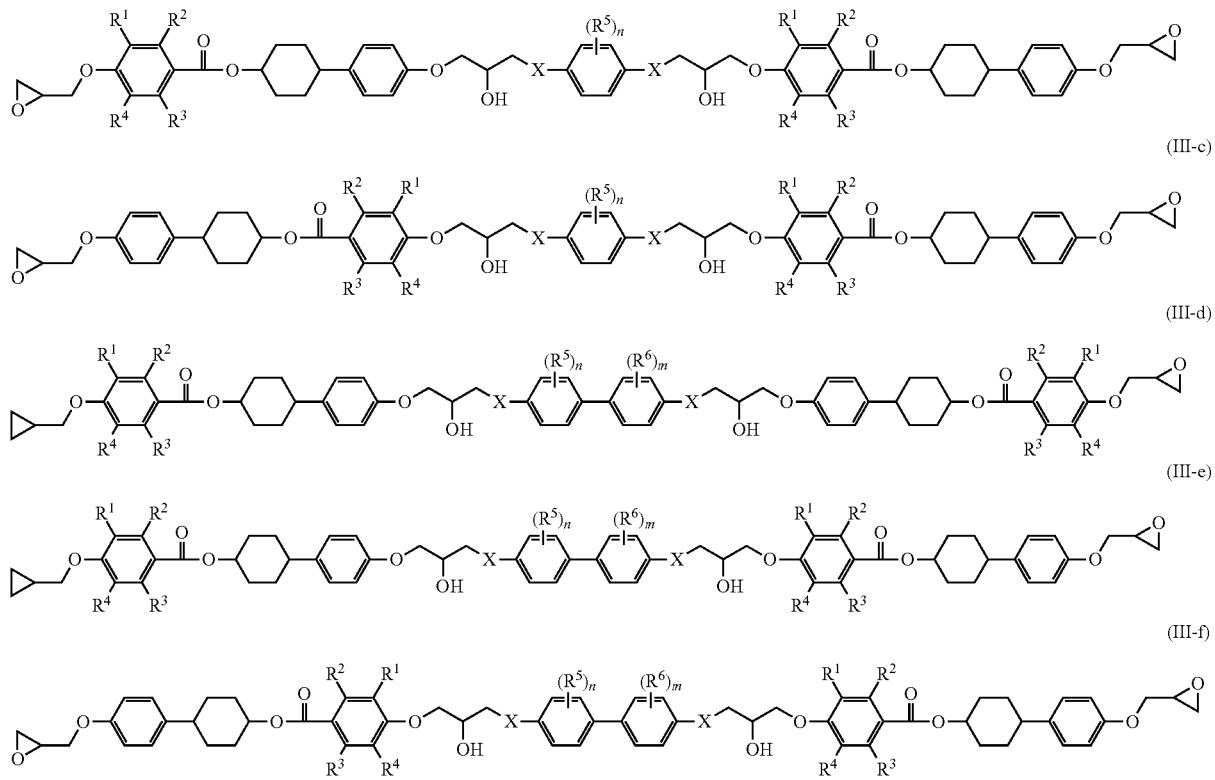

Definitions and preferred ranges of $R^1$ to $R^6$, n, m and X in Formulae (III-a) to (III-f) are the same as the definitions and preferred ranges of $R^1$ to $R^6$, n, m and X in Formulae (III-A) to (III-F).

(Method of Synthesizing Multimer)

The method of synthesizing the second epoxy compound, by allowing the first epoxy compound to react with a compound having a functional group that is capable of reacting with an epoxy group of the first epoxy compound, is not particularly limited. For example, the second epoxy compound may be obtained by a method of dissolving the first epoxy compound and a compound having a functional group that is capable of reacting with an epoxy group, and optionally a reaction catalyst, in a solvent, and stirring the same while heating.

Alternatively, for example, the second epoxy compound may be synthesized by mixing the first epoxy compound and a compound having a functional group that is capable of reacting with an epoxy group, and optionally a reaction catalyst, without a solvent, and stirring the same while heating.

The solvent is not particularly limited, as long as it can dissolve the first epoxy compound and a compound having a functional group that is capable of reacting with an epoxy group of the first epoxy compound, and can be heated to a temperature required to cause reaction of the compounds. Specific examples of the solvent include cyclohexanone, cyclopentanone, ethyl lactate, propyleneglycol monomethyl ether, N-methyl pyrrolidone, methyl cellosolve, ethyl cellosolve and propyleneglycol monopropyl ether.

The amount of the solvent is not particularly limited, as long as the first epoxy compound and a compound having a functional group that is capable of reacting with an epoxy group of the first epoxy compound, and optionally a reaction catalyst, can be dissolved at a reaction temperature. Although the degree of solubility depends on the type of the raw materials, the solvent and the like, the viscosity of the solvent after the reaction tends to be in a preferred range when the solvent is used in an amount that adjusts an initial solid content concentration to be from 20% by mass to 60% by mass, for example.

The compound having a functional group that is capable of reacting with an epoxy group of the first epoxy compound is not particularly limited. From the viewpoint of forming a smectic structure in a cured product, the compound is preferably at least one selected from the group consisting of a dihydroxybenzene compound, having a structure in which two hydroxy groups are bound to a benzene ring; a diaminobenzene compound, having a structure in which two amino groups are bound to a benzene ring; a dihydroxybiphenyl compound, having a structure in which each of the two benzene rings in the biphenyl group has a hydroxy group; and a diaminobiphenyl compound, having a structure in which each of the two benzene rings in the biphenyl group has an amino group, respectively. Hereinafter, the compounds are also referred to as specific aromatic compounds.

By causing reaction of an epoxy group of the first epoxy compound with a hydroxy group or an amino group of the specific aromatic compound, the second epoxy compound, having at least one structure selected from the group represented by Formulae (II-A) to (II-D), can be synthesized.

Examples of the dihydroxybenzene compound include 1,2-dihydroxybenzene (catechol), 1,3-dihydroxybenzene (resorcinol), 1,4-dihydroxybenzene (hydroquinone) and derivatives of these compounds.

Examples of the diaminobenzene compound include 1,2-diaminobenzene, 1,3-diaminobenzene, 1,4-diaminobenzene and derivatives of these compounds.

Examples of the dihydroxybiphenyl compound include 3,3'-dihydroxybiphenyl, 3,4'-dihydroxybiphenyl, 4,4'-dihydroxybiphenyl and derivatives of these compounds.

Examples of the diaminobiphenyl compound include 3,3'-diaminobiphenyl, 3,4'-diaminobiphenyl, 4,4'-diaminobiphenyl and derivatives of these compounds.

Derivatives of the specific aromatic compound include a specific aromatic compound having a substitute, such as an alkyl group of from 1 to 8 carbon atoms, on the benzene ring. A single kind of the specific aromatic compound may be used alone, or two or more kinds may be used in combination.

From the viewpoint of forming a smectic structure in a cured product of the epoxy resin, the specific aromatic compound is preferably 1,4-dihydroxybenzene, 1,4-diaminobenzene, 4,4'-dihydroxybiphenyl or 4,4'-diaminobiphenyl. Since the compounds have the hydroxy groups or the amino groups at a para position with respect to each other, the second epoxy compound obtained by reacting the compound with an epoxy monomer tends to have a straight structure. Therefore, a smectic structure tends to be formed in a cured product due to a high degree of stacking of the molecules.

The type of the reaction catalyst is not particularly limited, and may be selected based on the reaction rate, reaction temperate, storage stability and the like. Specific examples of the reaction catalyst include an imidazole compound, an organic phosphorous compound, a tertiary amine compound and a quaternary ammonium salt. A single kind of the reaction catalyst may be used alone, or two or more kinds may be used in combination.

From the viewpoint of heat resistance of a cured product, the reaction catalyst is preferably an organic phosphorous compound.

Examples of the organic phosphorous compound include an organic phosphine compound; a compound having intermolecular polarization obtained by adding, to an organic phosphine compound, a compound having a π bond such as a maleic acid anhydride, a quinone compound, diazodiphenyl methane or a phenol resin; and a complex formed by an organic phosphine compound and an organic boron compound.

Specific examples of the organic phosphine compound include triphenylphosphine, diphenyl(p-tolyl)phosphine, tris(alkylphenyl)phosphine, tris(alkoxyphenyl)phosphine, tris(alkylalkoxyphenyl)phosphine, tris(dialkylphenyl)phosphine, tris(trialkylphenyl)phosphine, tris(tetraalkylphenyl)phosphine, tris(dialkoxyphenyl)phosphine, tris(trialkoxyphenyl)phosphine, tris(tetraalkoxyphenyl)phosphine, trialkylphosphine, dialkylarylphosphine and alkyldiarylphosphine.

Specific examples of the quinone compound include 1,4-benzoquinone, 2,5-toluquinone, 1,4-naphthoquinone, 2,3-dimethylbenzoquinone, 2,6-dimethylbenzoquinone, 2,3-dimethoxy-5-methyl-1,4-benzoquinone, 2,3-dimethoxy-1,4-benzoquinone and phenyl-1,4-benzoquinone.

Specific examples of the organic boron compound include tetraphenyl borate, tetra-p-tolyl borate and tetra-n-butyl borate.

The amount of the reaction catalyst is not particularly limited. From the viewpoint of reaction rate and storage stability, the amount of the reaction catalyst is preferably from 0.1 parts by mass to 1.5 parts by mass, more preferably from 0.2 parts by mass to 1 part by mass, with respect to 100 parts by mass of the total amount of the first epoxy compound and the compound having a functional group that is capable of reacting with an epoxy group of the first epoxy compound.

In a case of synthesizing the second epoxy compound by using the first epoxy compound, the total of the first epoxy compound may react to form the second epoxy compound, or the first epoxy compound may partly remain in an unreacted state.

The second epoxy compound can be synthesized by using a reaction container, such as a flask in a small scale or a reaction cauldron in a large scale. A specific example of the synthesis method is described below.

The first epoxy compound is placed in a reaction container and a solvent is added as necessary, and the first epoxy compound is dissolved by heating the reaction container to a reaction temperature with an oil bath or a heating medium. Then, the compound having a functional group that is capable of reacting with an epoxy group of the first epoxy compound is added thereto. After dissolving the compound in the solvent, a reaction catalyst is added as necessary, thereby starting the reaction. Subsequently, the solvent is removed under reduced pressure as necessary, and the second epoxy compound is obtained.

The reaction temperature is not particularly limited, as long as the reaction of an epoxy group of the first epoxy compound and a functional group that is capable of reacting with an epoxy group can proceed. For example, the reaction temperature is preferably in a range of from 100° C. to 180° C., more preferably from 100° C. to 150° C. When the reaction temperature is 100° C. or higher, the time for completing the reaction tends to be shortened. When the reaction temperature is 180° C. or less, possibility of causing gelation tends to be reduced.

The ratio of the first epoxy compound and the compound having a functional group that is capable of reacting with an epoxy group of the epoxy monomer, used for the synthesis of the second epoxy compound, is not particularly limited. For example, the ratio may be adjusted to satisfy a ratio of the number of equivalent of epoxy group (A) to the ratio of the number of equivalent of the functional group that is capable of reacting with an epoxy group (B), represented by A/B, of from 100/100 to 100/1. From the viewpoint of fracture toughness and heat resistance of a cured product, the value of A/B is preferably from 100/50 to 100/1.

The structure of the multimer can be determined by, for example, matching a molecular weight of the second epoxy compound, which is presumed to be obtained by the reaction of the first epoxy compound and the compound having a functional group that is capable of reacting with an epoxy group of the first epoxy compound, with a molecular weight of a target compound obtained by liquid chromatography that is performed by a liquid chromatograph having a UV spectrum detector and a mass spectrum detector.

The epoxy equivalent amount of the epoxy resin is not particularly limited. From the viewpoint of fluidity of the epoxy resin and thermal conductivity of a cured product, the epoxy equivalent amount is preferably from 245 g/eq to 500 g/eq, more preferably from 250 g/eq to 450 g/eq, further preferably from 260 g/eq to 400 g/eq. When the epoxy equivalent amount of the epoxy resin is 245 g/eq or more, a degree of crystallinity of the epoxy resin is not too high and the fluidity is difficult to decrease. When the epoxy equivalent amount of the epoxy resin is 500 g/eq or less, cross-linking density of the epoxy resin is not too low and a high degree of thermal conductivity tends to be achieved. In the embodiment, the epoxy equivalent amount of the epoxy resin is measured by perchloric acid titration.

The number average molecular weight (Mn) and the weight average molecular weight (Mw) of the epoxy resin is not particularly limited. From the viewpoint of viscosity, the weight average molecular weight (Mw) of the epoxy resin is preferably selected from 1,200 to 1,550.

In the embodiment, the number average molecular weight (Mn) and the weight average molecular weight (Mw) of the epoxy resin is measured by liquid chromatography.

The liquid chromatography is performed at a sample concentration of 0.5% by mass and a flow rate of 1.0 ml/min, using tetrahydrofuran as a mobile phase. A calibration curve is obtained by using a polystyrene standard sample, and the Mn and Mw (polystyrene-based) are calculated.

The measurement can be performed by using a high performance liquid chromatograph (for example, L6000 from Hitachi, Ltd.) and a data analyzer (for example, C-R4A from Shimadzu Corporation) with GPC columns (for example, G2000HXL and G3000 HXL from Tosoh Corporation)

<Epoxy Resin Composition>

The epoxy resin composition of the embodiment includes the epoxy resin of the embodiment as described above, and a curing agent.

(Curing Agent)

The curing agent is not particularly limited, as long as it is capable of causing a curing reaction with the epoxy resin included in the epoxy resin composition. Specific examples of the curing agent include an amine curing agent, a phenol curing agent, an acid anhydride curing agent, a polymer-captan curing agent, a polyaminoamide curing agent, an isocyanate curing agent, and a block isocyanate curing agent. A single kind of the curing agent may be used alone, or two or more kinds may be used in combination.

From the viewpoint of forming a higher-order structure in a cured product of the epoxy resin composition, the curing agent is preferably an amine curing agent or a phenol curing agent, more preferably an amine curing agent. From the viewpoint of curing time, a compound having two or more amino groups that are directly bound to a benzene ring is further preferred.

Specific examples of the amine curing agent include 3,3'-diamnodiphenylsulfone, 4,4'-diaminodiphenylsulfone, 4,4'-diaminodiphenylmethane, 4,4'-diaminodiphenylether, 4,4'-diamino-3,3'-dimethoxybiphenyl, 4,4'-diaminophenylbenzoate, 1,5-diaminonaphthalene, 1,3-diaminonaphthalene, 1,4-diaminonaphthalene, 1,8-diaminonaphthalene, 1,3-diaminobenzene, 1,4-diaminobenzene, 4,4'-diaminobenzanilide and trimethylene-bis-4-aminobenzoate.

From the viewpoint of forming a smectic structure in a cured product of the epoxy resin composition, the curing agent is preferably selected from 4,4'-diaminodiphenylsulfone, 3,3'-diaminodiphenylsulfone, 1,3-diaminobenzene, 1,4-diaminobenzene, 4,4'-diaminobenzanilide, 1,5-diaminonaphthalene, 4,4'-diaminodiphenylmethane and trimethylene-bis-4-aminobenzoate. From the viewpoint of obtaining a cured product with a high Tg, the curing agent is more preferably 4,4'-diaminodiphenylsulfone and 4,4'-diaminobenzanilide.

Specific examples of the phenol curing agent include a low-molecular phenol compound and a phenol novolac resin obtained by linking low-molecular phenol compounds with a methylene group or the like. Specific examples of the low-molecular phenol compound include a monofunctional phenol compound such as phenol, o-cresol, m-cresol and p-cresol, a bifunctional phenol compound such as catechol, resorcinol and hydroquinone, and trifunctional phenol compound such as 1,2,4-trihydroxybenzene and 1,3,5-trihydroxybenzene.

The content of the curing agent in the epoxy resin composition is not particularly limited. From the viewpoint of efficiency of curing reaction, the content of the curing agent preferably satisfies a ratio of the active hydrogen equivalent (amine equivalent) of the curing agent to the epoxy equivalent (amine/epoxy) of from 0.3 to 3.0, more preferably from 0.5 to 2.0.

(Other Components)

The epoxy resin composition may include components other than the epoxy resin and the curing agent. For example, the epoxy resin composition may include a reaction catalyst, a filler or the like. Specific examples of the reaction catalyst include the compounds as described above as a reaction catalyst used for the synthesis of the specific epoxy compound.

(Use Application)

The use application of the epoxy resin composition is not particularly limited. The epoxy resin composition is suitably applied for a process in which the epoxy resin composition is subjected to relatively rapid heating. For example, the epoxy resin composition may be used for a process of producing FRPs, in which fibers are impregnated with an epoxy resin composition while heating, or a process of producing a sheet-like product in which an epoxy resin composition is spread with a squeegee or the like while heating.

The epoxy resin composition is also suitably applied for a process in which addition of a solvent for adjusting viscosity is desired to be omitted or reduced, for the purpose of suppressing formation of voids in a cured product.

<Epoxy Resin Cured Product and Composite Material>

The epoxy resin cured product of the embodiment is obtained by curing the epoxy resin composition of the embodiment. The composite material includes the epoxy resin cured product of the embodiment and a reinforcing material.

Specific examples of the reinforcing material include carbon material, glass, aromatic polyamide resins such as Kevlar (registered trade name), ultra high molecular weight polyethylene, alumina, boron nitride, aluminum nitride, mica and silicon. The form of the reinforcing material is not particularly limited, and examples thereof include fibers and particles (filler). The composite material may include a single kind of reinforcing material alone or may include two or more kinds in combination.

EXAMPLES

In the following, the invention is explained by referring to the Examples. However, the invention is not limited to these Examples.

<Synthesis of Resin 1>

To a 500-mL three-necked flask, 50 g of the first epoxy compound (4-{4-(2,3-epoxypropoxy)phenyl}cyclohexyl=4-(2,3-epoxypropoxy)benzoate, the following structure, epoxy equivalent amount: 224 g/eq) were placed, and 100 g of propylene glycol monomethyl ether (Fujifilm Wako Pure Chemical Corporation) were added. A cooling tube and a nitrogen inlet tube were attached to the flask, and a stirring blade was attached so as to be immersed in the solvent. Then, the flask was immersed in an oil bath at 120° C. and subjected to stirring. After confirming that the epoxy monomer was dissolved and the solution became clear, 3.07 g of hydrodquinone (Fujifilm Wako Pure Chemical Corporation, hydroxy equivalent amount: 55 g/eq) were added such that the equivalent ratio (A/B) of epoxy group A to phenolic hydroxy group B of hydroquinone was 100/25. Further, 0.5 g of triphenylphosphine (Fujifilm Wako Pure Chemical Corporation) as a reaction catalyst were added, and further heated at 120° C. After continuing the heating for 3 hours, propylene glycol monomethyl ether was evaporated under reduced pressure, and the residue was cooled to room temperature (25° C.). Resin 1, including a second epoxy compound obtained by reaction of a part of the first epoxy compound with hydroquinone, was thus obtained.

The first epoxy compound is a compound that is in a powder form (crystalline phase) at room temperature, and transfers to a nematic phase at 150° C. and an isotropic phase at 210° C. The method for producing the compound and the like are described in Japanese Patent No. 5471975.

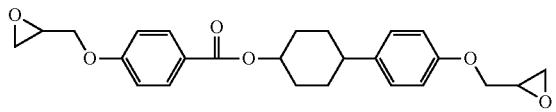 [SMILES: O=C(OC1CCC(c2ccc(OCC3CO3)cc2)CC1)c1ccc(OCC2CO2)cc1]

The proportion of the area of the peak derived from the first epoxy compound, from a chart obtained by liquid chromatography by the method as described above, with respect to the total amount of the epoxy resin was 45%. The number average molecular weight (Mn) of Resin 1 was 766, and the weight average molecular weight (Mw) of Resin 1 was 1,557.

The first epoxy compound, used for preparation of the epoxy resin, had a peak top at 27.7 min.

The liquid chromatography was performed by using L6000 from Hitachi, Ltd, a high-speed liquid chromatograph equipped with a UV detector and a mass spectrum detector, and C-R4A from Shimadzu Corporation as a data analyzer, together with G2000HXL and G3000HXL, GPC columns from Tosoh Corporation, as the columns.

The solid content of Resin 1 was measured by a heating loss method. Specifically, a sample was placed in an aluminum cap in an amount of from 2.0 g to 2.1 g, and allowed to stand for 30 minutes in a drying chamber at 180° C. The solid content of the sample was calculated from the measured weight before heating and the measured weight after heating, by the following formula. As a result, the solid content of Resin 1 was 99.7%.

Solid content (%)=(measured weight after allowing to stand for 30 minutes/measured weight before heating)×100

The epoxy equivalent amount of Resin 1, measured by perchloric acid titration, was 326 g/eq.

<Synthesis of Resin 2>

Resin 2, including a second epoxy compound obtained by reaction of a part of the first epoxy compound with resorcinol, was obtained by the same manner as Example 1, except that hydroquinone was changed to 3.07 g of resorcinol (Fujifilm Wako Pure Chemical Corporation, hydroxy equivalent amount: 55 g/eq) such that the equivalent ratio (A/B) of epoxy group A to phenolic hydroxy group B of resorcinol was 100/25.

The proportion of the first epoxy compound in Resin 2, measured by the same manner as Resin 1, was 48%. The Mn and the Mw of Resin 2 were 726 and 1,301, respectively.

The solid content of Resin 2, measured by the same manner as Resin 1, was 99.7%. The epoxy equivalent of Resin 2, measured by the same manner as Resin 1, was 320 g/eq.

<Synthesis of Resin 3>

Resin 3, including a second epoxy compound obtained by reaction of a part of the first epoxy compound with catechol, was obtained by the same manner as Example 1, except that hydroquinone was changed to 3.07 g of catechol (Fujifilm Wako Pure Chemical Corporation, hydroxy equivalent amount: 55 g/eq) such that the equivalent ratio (A/B) of epoxy group A to phenolic hydroxy group B of catechol was 100/25.

The proportion of the first epoxy compound in Resin 3, measured by the same manner as Resin 1, was 47%. The Mn and the Mw of Resin 2 were 712 and 1,220, respectively.

The solid content of Resin 3, measured by the same manner as Resin 1, was 99.7%. The epoxy equivalent of Resin 3, measured by the same manner as Resin 1, was 318 g/eq.

<Synthesis of Resin 4>

Resin 4, including a second epoxy compound obtained by reaction of a part of the first epoxy compound with 4,4'-dihydroxybiphenyl, was obtained by the same manner as Example 1, except that the amount of the first epoxy compound was changed to 35 g, the amount of the propyleneglycol monomethyl ether was changed to 70 g, the amount of triphenylphosphine was changed to 0.35 g, and hydroquinone was changed to 3.64 g of 4,4'-dihydroxybiphenyl (Fujifilm Wako Pure Chemical Corporation, hydroxy equivalent amount: 93 g/eq) such that the equivalent ratio (A/B) of epoxy group A to phenolic hydroxy group B of 4,4'-dihydroxybiphenyl was 100/25.

The proportion of the first epoxy compound in Resin 4, measured by the same manner as Resin 1, was 44%. The Mn and the Mw of Resin 4 were 778 and 1,589, respectively.

The solid content of Resin 4, measured by the same manner as Resin 1, was 99.6%. The epoxy equivalent of Resin 4, measured by the same manner as Resin 1, was 342 g/eq.

<Synthesis of Resin 5> Resin 5, including a second epoxy compound obtained by reaction of a part of the first epoxy compound with hydroquinone, was obtained by the same manner as Example 1, except that the amount of hydroquinone was changed to 1.60 g such that the equivalent ratio (A/B) of epoxy group A to phenolic hydroxy group B of hydroquinone was 100/I 3.

The proportion of the first epoxy compound in Resin 5, measured by the same manner as Resin 1, was 66%. The Mn and the Mw of Resin 5 were 584 and 1,013, respectively.

The solid content of Resin 5, measured by the same manner as Resin 1, was 99.7%. The epoxy equivalent of Resin 5, measured by the same manner as Resin 1, was 270 g/eq.

<Synthesis of Resin 6>

Resin 6, including a second epoxy compound obtained by reaction of a part of the first epoxy compound with hydroquinone, was obtained by the same manner as Example 1, except that propyleneglycol monomethyl ether was changed to 80 g of cyclohexanone (Fujifilm Wako Pure Chemical Corporation), and 3.07 g of hydroquinone were added such that the equivalent ratio (A/B) of epoxy group A to phenolic hydroxy group B of hydroquinone was 100/25, and the temperature of the oil bath was changed to 150° C.

The proportion of the first epoxy compound in Resin 6, measured by the same manner as Resin 1, was 51%. The Mn and the Mw of Resin 5 were 712 and 1,220, respectively.

The solid content of Resin 6, measured by the same manner as Resin 1, was 99.6%. The epoxy equivalent of Resin 6, measured by the same manner as Resin 1, was 314 g/eq.

<Synthesis of Resin 7>

Resin 7, including a second epoxy compound obtained by reaction of a part of the first epoxy compound with resorcinol, was obtained by the same manner as Example 2, except that the amount of resorcinol was changed to 2.5 g such that the equivalent ratio (A/B) of epoxy group A to phenolic hydroxy group B of resorcinol was 100/20.

The proportion of the first epoxy compound in Resin 7, measured by the same manner as Resin 1, was 57%.

The solid content of Resin 7, measured by the same manner as Resin 1, was 99.6%.

<Synthesis of Resin 8> Resin 8, including a second epoxy compound obtained by reaction of a part of the first epoxy compound with resorcinol, was obtained by the same manner as Example 2, except that the amount of resorcinol was changed to 3.7 g such that the equivalent ratio (A/B) of epoxy group A to phenolic hydroxy group B of resorcinol was 100/30.

The proportion of the first epoxy compound in Resin 8, measured by the same manner as Resin 1, was 39%.

The solid content of Resin 8, measured by the same manner as Resin 1, was 99.6%.

<Measurement of Viscosity Behavior>

The viscosity behavior of Resins 1 to 6 was evaluated by measuring a dynamic shear viscosity (Pa·s), with a rheometer (MCR-301, Anton-Paar) at a vibrational mode. The measurement was performed by using a parallel plate with a diameter of 12 mm, at a frequency of 1 Hz, a gap of 0.2 mm and a distortion of 2%. Prior to the measurement, the epoxy resin was melted at 150° C. for at least 3 minutes. Then, a process of decreasing the temperature from 150° C. to 30° C. at a rate of 2° C./min and a process of elevating the temperature from 30° C. to 150° C. at a rate of 2° C./min were performed in this order.

During the process of decreasing the temperature and the process of increasing the temperature, the viscosity of the epoxy resin was measured at least once while the temperature changes by 1° C. The viscosity behavior of the epoxy resin was evaluated by the following criteria. The results are shown in Table 1. The measured values of dynamic shear viscosity at 90° C. (Pa·s) during the process of increasing the temperature are also shown in Table 1.

Yes: The epoxy resin showed a temporal increase in viscosity during the process of increasing the temperature from 30° C. to 150° C.

No: The epoxy resin decreased in viscosity without a temporal increase during the process of increasing the temperature from 30° C. to 150° C.

Example 1

10 g of Resin 1 and 1.90 g of 4,4'-diaminodiphenylsulfone as a curing agent (DDS) were placed in a stainless steel dish, such that the equivalent ratio of the epoxy group to the amino group (epoxy group/amino group) was 1/1. The mixture was heated on a hot plate to 180° C. and allowed to melt while stirring, and the heating was continued for 1 hour. Then, the temperature of the hot plate was changed to 230° C., and the heating was continued for 1 hour to obtain a cured product. After cooling to room temperature (25° C.), the cured product was taken out from the dish and heated in an oven at 230° C. for 1 hour to complete the curing, thereby obtaining an epoxy resin cured product.

A sample for evaluating fracture toughness having a size of 3.75 mm×7.5 mm×33 mm and a sample for evaluating glass transition temperature having a size of 2 mm×0.5 mm×40 mm were prepared from the epoxy resin cured product, respectively.

Example 2

Samples for evaluation were prepared in the same manner to Example 1, except that Resin 1 was changed to the same amount of Resin 2 and the amount of DDS was changed to 1.94 g.

Example 3

Samples for evaluation were prepared in the same manner to Example 1, except that Resin 1 was changed to the same amount of Resin 3 and the amount of DDS was changed to 1.95 g.

Example 4

Samples for evaluation were prepared in the same manner to Example 1, except that Resin 1 was changed to the same amount of Resin 4 and the amount of DDS was changed to 1.81 g.

Comparative Example 1

Samples for evaluation were prepared in the same manner to Example 1, except that Resin 1 was changed to the same amount of Resin 5 and the amount of DDS was changed to 2.30 g.

Comparative Example 2

Samples for evaluation were prepared in the same manner to Example 1, except that Resin 1 was changed to the same amount of Resin 6 and the amount of DDS was changed to 1.97 g.

Comparative Example 3

Samples for evaluation were prepared in the same manner to Example 1, except that Resin 1 was changed to the same amount of Resin 7 and the amount of DDS was changed to 2.11 g.

Comparative Example 4

Samples for evaluation were prepared in the same manner to Example 1, except that Resin 1 was changed to the same amount of Resin 8 and the amount of DDS was changed to 1.81 g.

<Formation of Smectic Structure>

The epoxy resin cured product was subjected to X-ray diffraction measurement, in order to confirm whether or not a smecctic structure was formed. The measurement was conducted by using CuKα1 line, under a tube voltage of 40 kV, a tube current of 20 mA, a sampling width of 0.01°, a scan rate of 1°/min, and a measurement range of 2θ=2° to 30°. The measurement was performed by using a X-ray diffractometer (Rigaku Corporation) and the results are evaluated by the following criteria. The results are shown in Table 1.

Yes: a diffraction peak appears in a range of 2θ=2° to 100, indicating that a smectic structure is formed.

No: a diffraction peak does not appear in a range of 2θ=2° to 10°, indicating that a smectic structure is not formed.

<Evaluation of Fracture Toughness>

The fracture toughness (MPa·m$^{1/2}$) of the samples was measured by a three-point bending test according to ASTM D5045 with a tester (Instron 5948 from Instron). The results are shown in Table 1.

<Evaluation of Heat Resistance>

The glass transition temperature (Tg, °C.) of the samples was measured as an indicator for heat resistance. The measurement was performed by a dynamic viscoelasticity measurement at a tensile mode, at a frequency of 10 Hz, a rate of temperature elevation of 5° C./min, and a distortion of 0.1%. The measurement was performed by using RSA-G2 (TA Instruments). The temperature corresponding to the maximum value of tan δ in a temperature-tan δ chart was determined as a glass transition temperature. The results are shown in Table 1.

TABLE 1

|  | Proportion of first epoxy compound [%] | Viscosity of epoxy resin | | Properties of epoxy resin cured product | | |
|---|---|---|---|---|---|---|
|  |  | Increase in viscosity during temperature increase | Viscosity at 90° C. [Pa · s] | Formulation of smectic structure | Fracture toughness [MPa · m$^{1/2}$] | Glass transition temperature [° C.] |
| Example 1 | 45 | No | 590 | Yes | 1.3 | 225 |
| Example 2 | 48 | No | 950 | Yes | 1.4 | 205 |
| Example 3 | 47 | No | 720 | Yes | 1.4 | 205 |
| Example 4 | 44 | No | 5 | Yes | 1.3 | 225 |
| Comparative Example 1 | 66 | No | 696,000 | Yes | 1.3 | 240 |
| Comparative Example 2 | 51 | Yes | 30,500 | Yes | 1.3 | 230 |
| Comparative Example 3 | 57 | Yes | 121,000 | Yes | 1.3 | 224 |
| Comparative Example 4 | 39 | No | 10,300 | Yes | 1.2 | 195 |

As shown in Table 1, the epoxy resins prepared in the Examples, in which the proportion of the first epoxy compound is from 40% to 50% with respect to the total amount of the epoxy resin, decreased its viscosity without a temporal increase during the process of increasing the temperature. On the other hand, the epoxy resins prepared in Comparative Examples 1 to 3, in which the proportion of the first epoxy compound is greater than 50% with respect to the total amount of the epoxy resin, had a temporal increase in viscosity during the process of increasing the temperature.

Further, the epoxy resins prepared in the Examples had an excellent fluidity, with a dynamic shear viscosity of less than 1,000 Pa·s, as compared with the epoxy resin prepared in Comparative Example 4, with a dynamic shear viscosity of greater than 10,000 Pa·s.

The reason for these results is considered to be that precipitation of crystals, which occurs as the temperature of the epoxy resin decreases, is more suppressed in the Examples than in the Comparative Examples.

From the above results, it is found that the epoxy resin of the embodiment exhibits excellent handleability. In addition, the cured product of the epoxy resins prepared in Examples 1 to 4 have a high degree of fracture toughness and a high glass transition temperature.

The disclosure of PCT/JP2016/080631 is incorporated herein in its entirety by reference.

All publications, patent applications, and technical standards mentioned in this specification are herein incorporated by reference to the same extent as if each individual publication, patent application, or technical standard was specifically and individually indicated to be incorporated by reference.

The invention claimed is:

1. An epoxy resin, comprising a reaction product of a first diepoxy compound having a single mesogenic structure and a reactive compound having two functional groups capable of reacting with the epoxy groups of the first diepoxy compound, said reaction product comprising a first epoxy compound and a second epoxy compound, wherein the first epoxy compound is the first diepoxy compound which has not undergone reaction with the reactive compound, wherein the second epoxy compound is a reaction product of the first diepoxy compound and the reactive compound, the second epoxy compound having two or more mesogenic structures that are the same as the mesogenic structure of the first epoxy compound, a proportion, determined by liquid chromatography, of the first epoxy compound being from 40% to 50% with respect to a total amount of the epoxy resin, and an epoxy equivalent amount of the epoxy resin being 500 g/eq or less; and wherein the second epoxy compound has a reaction residue structure of the reactive compound represented by the following Formula (A) or Formula (B):

wherein, in Formula (A) and Formula (B), each * refers to a bonding site to an adjacent atom of the functional groups, each of $R^1$ to $R^3$ independently represents an alkyl group having from 1 to 8 carbon atoms, and each of n, m, and l independently represents an integer of from 0 to 4.

2. The epoxy resin according to claim 1, wherein the first epoxy compound comprises an epoxy compound represented by the following Formula (M):

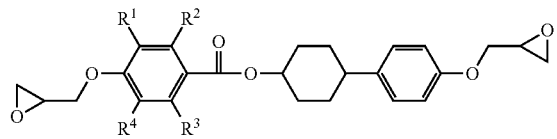
(M)

wherein, in Formula (M), each of $R^1$ to $R^4$ independently represents a hydrogen atom or an alkyl group having from 1 to 3 carbon atoms.

3. The epoxy resin according to claim 1, wherein the second epoxy compound comprises two or more mesogenic structures represented by the following Formula (I):

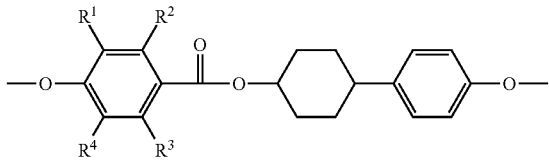
(I)

wherein, in Formula (I), each of $R^1$ to $R^4$ independently represents a hydrogen atom or an alkyl group having from 1 to 3 carbon atoms.

4. The epoxy resin according to claim 3, wherein the second epoxy compound comprises two of the mesogenic structures represented by Formula (I).

5. The epoxy resin according to claim 1, wherein the second epoxy compound comprises at least one selected from the group consisting of structures represented by the following Formulae (II-A) to (II-D):

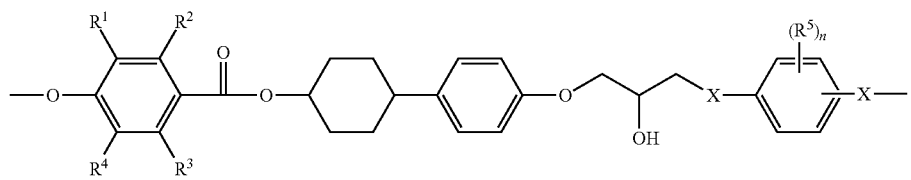
(II-A)

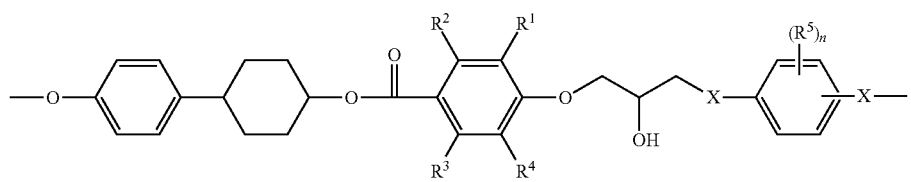
(II-B)

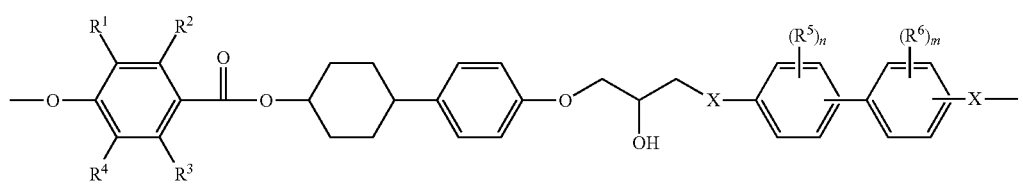
(II-C)

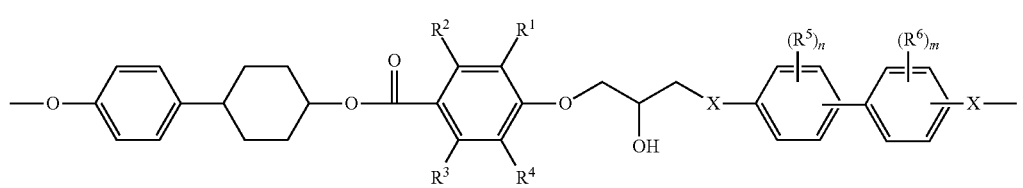
(II-D)

wherein, in Formulae (II-A) to (II-D), each of $R^1$ to $R^4$ independently represents a hydrogen atom or an alkyl group having from 1 to 3 carbon atoms, each of $R^5$ and $R^6$ independently represents an alkyl group having from 1 to 8 carbon atoms, each of n and m independently represents an integer from 0 to 4, and each X independently represents —O— or —NH—.

6. An epoxy resin composition, comprising the epoxy resin according to claim 1 and a curing agent.

7. The epoxy resin composition according to claim 6, configured to form a smectic structure in a cured state.

8. An epoxy resin cured product, comprising a cured product of the epoxy resin composition according to claim 6.

9. A composite material, comprising the epoxy resin cured product according to claim 8 and a reinforcing material.

* * * * *